US008539460B2

(12) United States Patent
Raju et al.

(10) Patent No.: US 8,539,460 B2
(45) Date of Patent: Sep. 17, 2013

(54) UNIQUE VERSATILE EXECUTOR ENGINE WHICH CAN INTERPRET AND EXECUTE TRANSACTION STRUCTURES AND INFORMATION VIEWS TO BUILD INFORMATION SYSTEMS

(75) Inventors: Ramalinga Reddiar Shanmuga Raju, Karnataka (IN); Tumkur Vajramsetty Jayawanth, Karnataka (IN); Manavasi Santhanam Sabarish, Karnataka (IN)

(73) Assignee: Agile Labs Private Limited, Jayanagar, Bangalore (IN)

( * ) Notice: Subject to any disclaimer, the term of this patent is extended or adjusted under 35 U.S.C. 154(b) by 2603 days.

(21) Appl. No.: 10/500,919

(22) PCT Filed: Jul. 23, 2002

(86) PCT No.: PCT/IN02/00154
§ 371 (c)(1),
(2), (4) Date: Jul. 8, 2004

(87) PCT Pub. No.: WO03/058445
PCT Pub. Date: Jul. 17, 2003

(65) Prior Publication Data
US 2005/0154659 A1 Jul. 14, 2005

(30) Foreign Application Priority Data
Jan. 8, 2002 (IN) .......................... 0020/MAS/2002

(51) Int. Cl.
*G06F 9/45* (2006.01)
(52) U.S. Cl.
USPC ........................................................ 717/139
(58) Field of Classification Search
USPC ............ 717/100, 102–105, 107, 139; 706/11
See application file for complete search history.

(56) References Cited

U.S. PATENT DOCUMENTS

| | | | |
|---|---|---|---|
| 4,920,499 A | | 4/1990 | Skeirik |
| 5,625,823 A | | 4/1997 | Debenedictis |
| 5,734,837 A | * | 3/1998 | Flores et al. ...................... 705/7 |
| 5,796,967 A | * | 8/1998 | Filepp et al. .................. 715/764 |
| 5,961,610 A | * | 10/1999 | Kelly et al. .................... 719/318 |
| 6,047,059 A | * | 4/2000 | Lin et al. ....................... 379/230 |
| 6,115,646 A | * | 9/2000 | Fiszman et al. ............... 700/181 |
| 6,145,739 A | * | 11/2000 | Bertina et al. ................ 235/380 |
| 6,167,563 A | | 12/2000 | Fontana |
| 6,199,100 B1 | * | 3/2001 | Filepp et al. .................. 709/203 |

(Continued)

OTHER PUBLICATIONS

Barroso, et al. "Piranha: a scalable architecture base on single-chip multirocessing", ACM, Jun. 2000, ISCA '00, pp. 282-293.*

*Primary Examiner* — Anna Deng
(74) *Attorney, Agent, or Firm* — Hamre, Schumann, Mueller & Larson, P.C.

(57) ABSTRACT

The embodiments herein are concerned with building an information system for enterprises. It has a unique versatile executor engine, which can interpret and execute transaction structures and information views. The information system can grow along with the needs of the enterprise. An information system built in this methodology will allow online and on site creation of new options and changing the existing options without any down time. The embodiments herein incorporate a unique technology, which enables an information system to be built without writing software programs. This makes information system building simple and quick. The data is analyzed and split into transaction structures and information views. These are then defined using the builder, which stores these definitions as data. This is intercepted and executed by the unique executor engine to provide the necessary information.

8 Claims, 6 Drawing Sheets

(56) References Cited

U.S. PATENT DOCUMENTS

Figure 1:
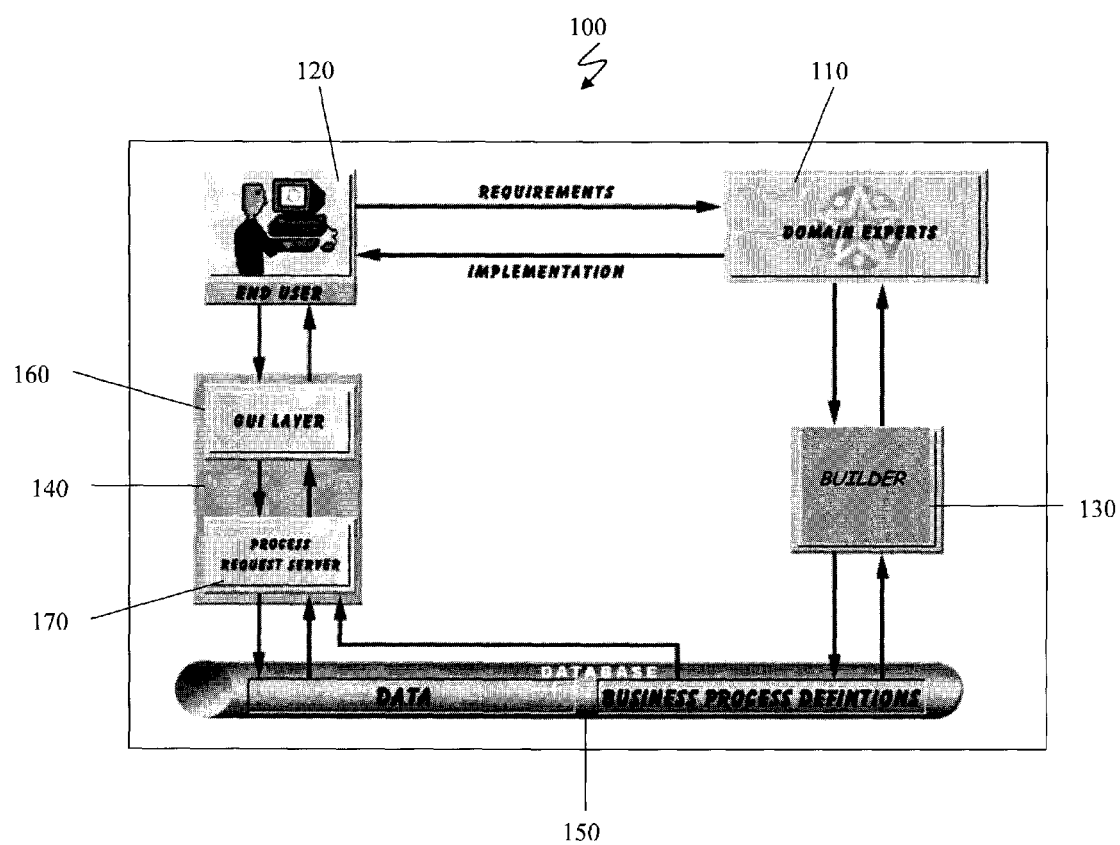

| | | |
|---|---|---|
| 6,199,195 B1 | 3/2001 | Farrar et al. |
| 6,230,309 B1 | 5/2001 | Gibson et al. |
| 6,237,005 B1 * | 5/2001 | Griffin ......................... 707/102 |
| 6,640,304 B2 * | 10/2003 | Ginter et al. .................. 713/193 |

\* cited by examiner

UNIQUE VERSATILE EXECUTOR ENGINE WHICH CAN INTERPRET AND EXECUTE TRANSACTION STRUCTURES AND INFORMATION VIEWS TO BUILD INFORMATION SYSTEMS

FIELD OF INVENTION

This invention in general relates to the field of building information systems for enterprises. Further, this invention relates to an unique versatile executor engine, which can interpret and execute transaction structures and information views. Hence, the information system thus built can grow along with the needs of the enterprise.

The novelty lies in the new methodology that has been evolved to build information systems with an executor engine.

An information system built in this methodology will allow online and on site creation of new options and changing the existing options without any down time.

Software programs are not written to build an information system in this methodology. The information system is analyzed and split into transaction structures and information views. These are then defined using the PROFIT 5RM builder, which stores these definitions as data. This is interpreted and executed by the executor engine to provide the necessary information system. The architecture of the system is described in detail and illustrated in the first figure of the drawing.

Accordingly an information system can be built in very short time. An estimated minimum of 1:50 time saving can be achieved in this methodology in comparison with the prior art.

Further the system enables domain experts to build information systems without the help of programmers or programming team.

The salient feature of the invention is in the provision of features to overcome the following limitations in the prior art.

The steps involved to provide an end to end business solution are various and elaborate, often time consuming and developed at huge costs.

At first the consumer poses his requirements to the domain expert who in turn analyses and structures the solution and passes it on to the programming team. They then write a program to suit the needs. Such programs will be to a specific process and have limited flexibility. Any further changes, if at all to be incorporated, have to be made by the programming team.

The success of this novel program according to the invention depends upon the ability of the programming team, to comprehend fully both the business process in its entirety and the technical know how. Such people quipped with both domain expertise and technical expertise are very rare in the industry. So, sourcing such people, hiring the team and the time constraint could only send the developing costs, spiraling up, rendering such solution providers less competitive.

PRIOR ART

It is to be noted that none of the existing business process solution providers has an executor interpreter that can interpret transaction structures and information views. So, programming skills are essential to maneuver the software. This results in considerable investment of human resources, hardware, and software resources.

It is obvious that the existing business process solution providers target specific business processes limiting their scope of usage and also their flexibility to accommodate changes. Because of this flexibility constraint, such solution providers cannot grow with the needs on time.

The architecture is not adaptable to change in business trends and very few options are available to customize and often become redundant. The objects of handling core functionality are huge and hence in a significant measure render them less scalable.

The code keeps on changing from customer to customer making them more bug-prone. The domain expert cannot build solutions without the help of programming team.

Huge programming time, less flexiblility, considerable maintenance costs (programmers to being involved at each stage of accommodating change), high failure rate, lack of versatility (provide solutions to specific business needs) makes it very difficult to built and maintain information systems.

It is envisaged to invent an "unique executor engine" which encompasses and caters to each and every requirement of business process. It is versatile, flexible, substantial time and cost-saving, user friendly, easily scalable, no programming skills required and all importantly no failure and never redundant.

Accordingly it is the primary object of the invention to invent an unique versatile executor engine, which interprets and executes the transaction structures and information views.

It is another object of the invention to invent a new methodology, which simplifies business software development.

It is another object of the invention to invent an unique executor engine, which is versatile and flexible.

It is another object of the invention to invent an unique versatile executor engine which on use results in substantial time saving.

It is another object of the invention to invent an unique versatile executor engine, which on use results in substantial time saving.

It is another object of the invention to invent an unique versatile executor engine wherein no programming skills are required.

Further objects of the invention will be clear from the following description:

An unique versatile executor engine which interprets transaction structures and information views wherein the said software tool, has two parts namely builder and executor engine. The builder will capture the business process in terms of transaction structures with process maps and information views. The executor engine will read and execute the definitions. The architecture of the executor engine has been made in such a way that a way that scaling to new technologies can be made with ease without affecting the existing information system.

Accordingly the invention has many essential features which are enumerated in the following description.

1. An unique versatile executor engine which can interpret and execute transaction structures and information views to build information system comprises essentially a software tool being of two parts, a builder and an executor engine, the builder being to capture the business process in terms of transaction structure with process maps and information views, the executor engine being to read and execute the definitions, the said executor engine having an unique architecture in such a way that scaling of new technologies can be made with ease without affecting the existing information system.

2. An unique versatile executor engine which can interpret and execute transaction structures and information views to build information system wherein the transaction structure is a collection of
a) Data containers
b) GUI Definitions
c) Validation statements
d) Process maps
e) Print formats
3. An unique versatile executor engine which can interpret and execute transaction structures and information views to build information system wherein the said executor engine has an unique technology, which enables an information system to be built by representing the system requirements as transaction structures and information views and storing them as data, instead of writing software programs to achieve the same, thus making information system building simple and quick.
4. An unique versatile executor engine which can interpret and execute transaction structures and information views to build information system wherein the said executor engine has open-ended architecture of PROFIT 5RM which facilitates easy scalability to new technologies without affecting the already made information structure and further, allows change in the information structure immaterial of the technology extensions made.
5. An unique versatile executor engine which can interpret and execute transaction structures and information views to build information system wherein PROFIT 5RM incorporates an a unique technology, which enables an information system to be built without writing software programs and this makes information system building simple and quick.
6. An unique versatile executor engine which can interpret and execute transaction structures and information views to build information system wherein PROFIT 5RM has the technology in which the information system is analyzed and split into transaction structures and information views and these are then defined using the PROFIT 5RM builder, which stores these definitions as data and this being interpreted and executed by the unique executor engine to provide the necessary information.
7. An unique versatile executor engine which can interpret and execute transaction structures and information views to build information system wherein application of software reduces software development cycle time in a ratio of 1:50 as compared to the traditional methodology.
8. An unique versatile executor engine which can interpret and execute transaction structures and information views to build information system wherein the said executor engine possesses a technology which is domain-neutral and hence can be used to build information systems for all domains.
9. An unique versatile executor engine which can interpret and execute transaction structures and information views to build information system wherein the system possesses a technology, which facilitates onsite as well as online development and which can be maintained with ease.

The nature of the invention and the manner in which the invention is to be performed is clearly described through drawings, which accompany the description.

SHORT DESCRIPTION OF FIGURES OF DRAWINGS

FIG. 1 of the drawing shows the open-ended architecture of a tool for building an information system.

Figure 2:
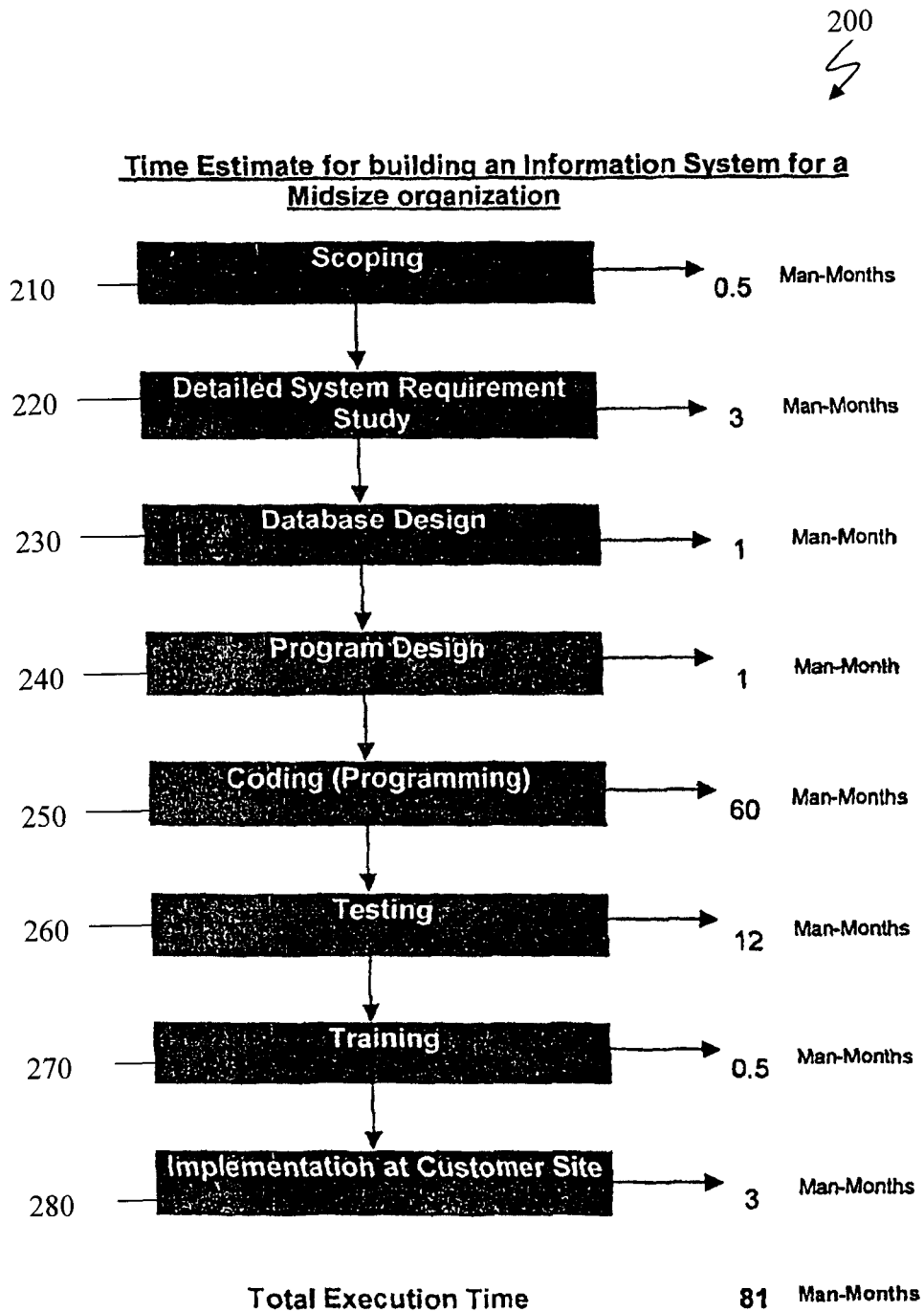

FIG. 2 of the drawing shows the development cycle according to prior art.

Figure 3:
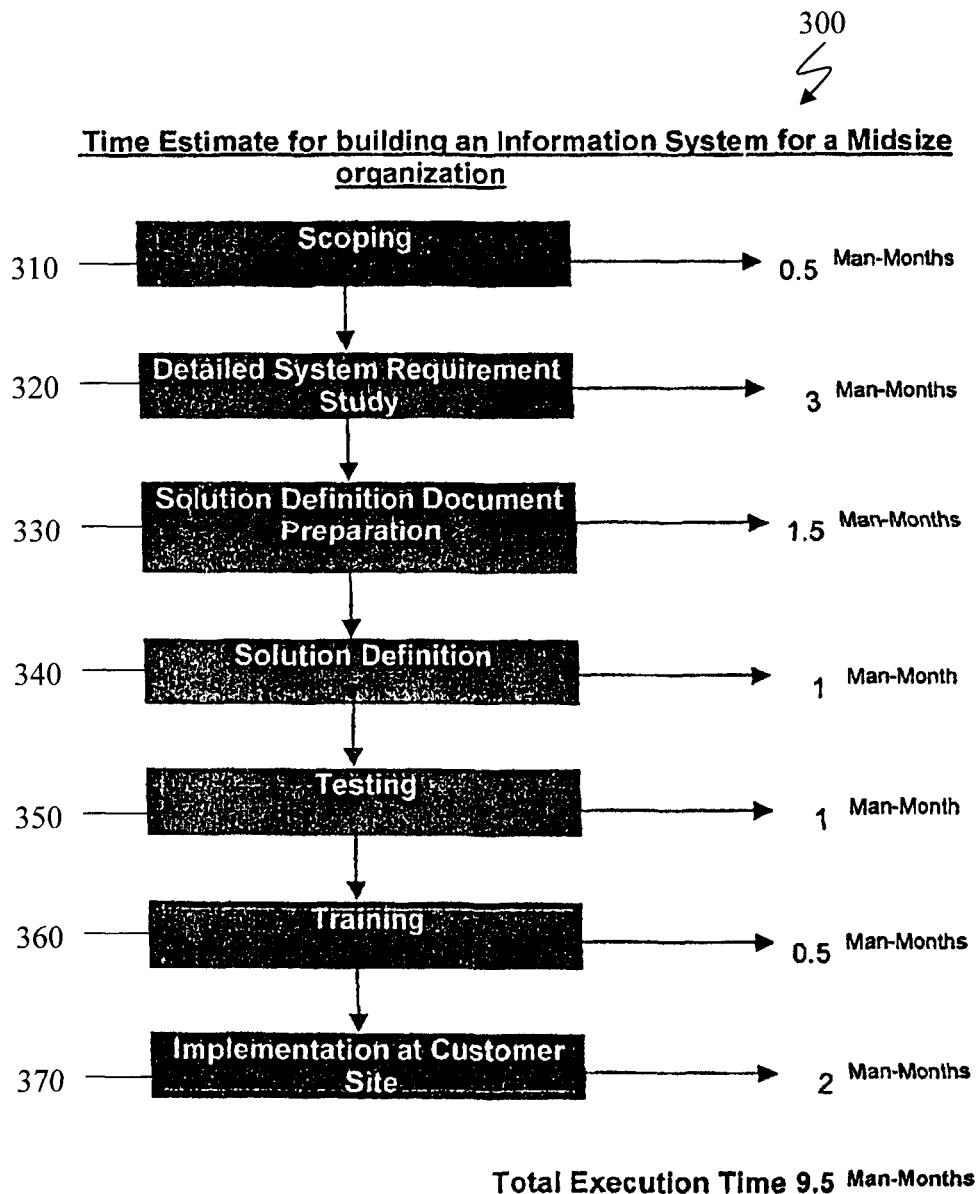

FIG. 3 of the drawings shows the development cycle according to one embodiment.

Figure 4:
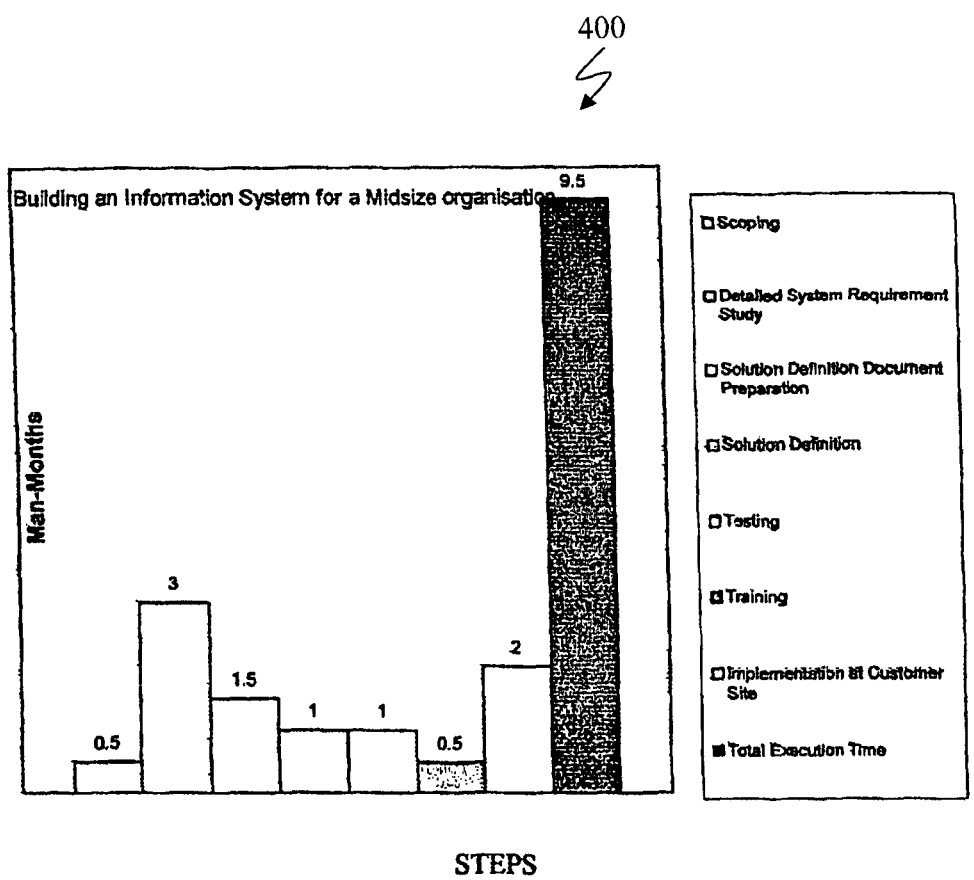

FIG. 4 of the drawings shows the time frame for building an information system according to one embodiment.

Figure 5:
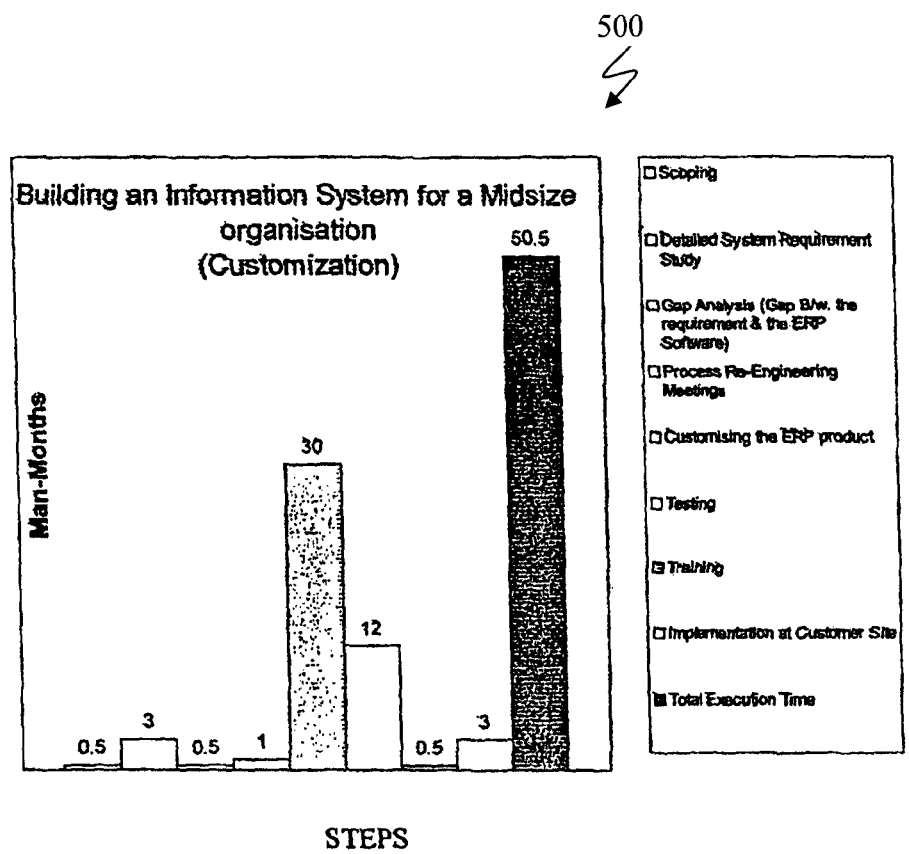

FIG. 5 of the drawings shows the time frame for building an information system with products developed in the prior art.

Figure 6:
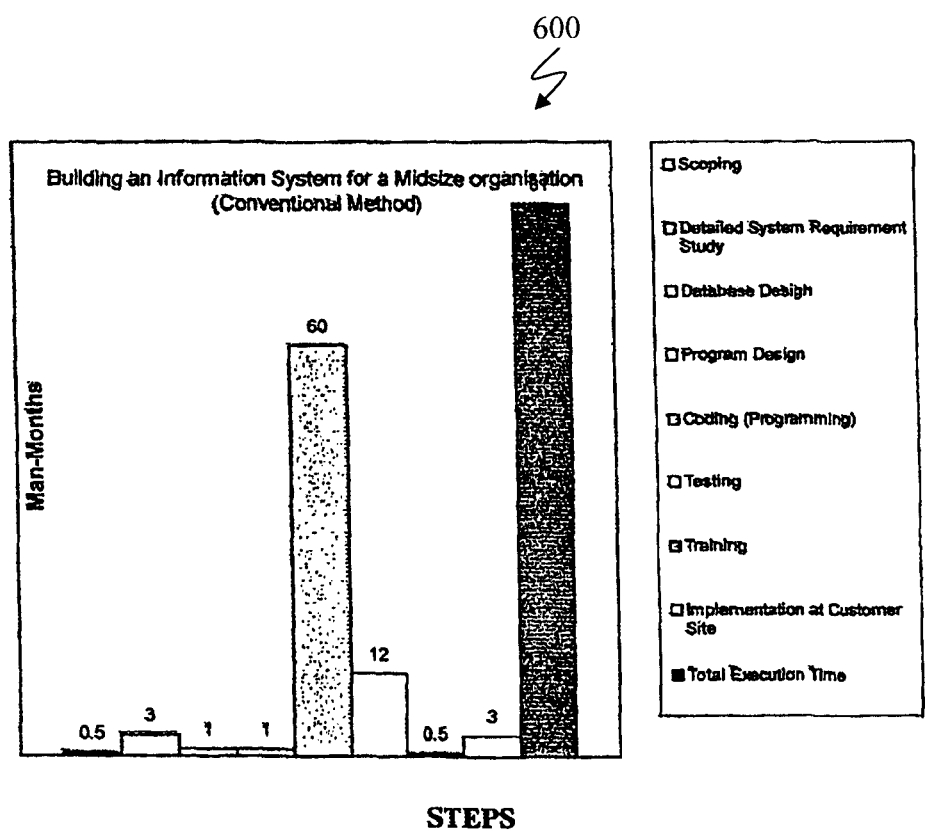

FIG. 6 of the drawings shows the time frame for building an information system with products developed in the prior art.

DETAILED DESCRIPTION OF A PREFERRED EMBODIMENT OF THE INVENTION

PROFIT 5RM Architecture

Refer to FIG. 1 for the open ended architecture diagram of a tool for building an information system 100.

A domain expert 110 interacts with the end user 120 and understands the information system required by the organization.

The information system is analyzed and made into simple structures called Transaction Structures and Information Views. These are defined using the Builder 130.

The Builder 130 stores the definitions of Transaction Structures and Information View as data into the database 150.

The Graphical User Interface Layer (GUIL) 160 presents a user interface for the end user 120 based on the Transaction Structure.

The GUIL 160 interacts with the end user and submit various requests for transaction processing or information request to the Process Request Server 170.

Process Request Server (PRS) 170 provides services to process transactions and information requests. The Transaction Structures govern the transaction processing done by the PRS 170. The Information Views govern the processing of information requests.

In this approach, software programs are not written to make an information system. Instead, an information system is made into Transaction Structures and Information View and stored in the database 150.

Transaction Structures[Tstruct]

Transaction Structures are the building blocks of an information system. These govern the data input, validation and storage functionality of an information system.

A transaction structure is collection of
Data containers
GUI Definitions
Validation statement
Process maps
Print formats The executor engine 140 interprets a Transaction Structure and a transaction form is presented to the end user 120. The end user 120 can input data into the information system through these forms.

Data Containers are logical groups of input data in transaction structure. Containers can be classified into simple and tabular. A simple container will hold input fields which will hold only one value in a single transaction. A tabular container will hold input fields in the form of the grid and hence can hold many values in single transaction. A transaction structure and have any number of containers.

Input fields are elements, which hold a piece of data of a transaction. Each container can have one or more input fields.

An input field is identified thorough a name that is unique in a transaction structure.

Input fields can be categorized into simple, calculated, auto-generated and referral fields.

Simple input fields accept data into it based on the type definition.

Calculated input fields, evaluate an expression to get its value. The expression could be based on any field in the Tstruct.

Auto-generated fields generate serial number for each transaction.

Referral fields allow user to pick data from other transactions. Defining SQL statement, as part of the input field does this. The result set of the SQL will be presented to the end user for selection.

GUI Definitions can be made to set the look and feel of the transaction forms.

The Validation Statement is an expression, which controls the validity of each transaction entered through the transaction form.

Process maps provide a way of relating transaction structures and passing data from one transaction to another.

Three kinds of process maps are required for an information system:
Transaction Generator
Master—Detail
Transaction—Group Transaction Generator maps a source transaction structure to a target transaction structure. Such a mapping will create one ore more target transaction automatically when the source transaction is stored. Mapping fields in the source to that in the target does it.

Master—Detail maps are made to update data from a detail transaction into another related transaction called the master transaction. The field in the details is mapped to a field in the master along with the type of update to be done.

Transaction—Group maps represent a many-to-many user-controlled relationship between transactions from many transaction structures. Transactions from the different structures that need to be related are posted to a common transaction structure. This common transaction structure is called the Group Structure.

Each group is a collection of transactions. The first transaction in the group is called the group header and the subsequent transactions are called the group elements. An input field in the group Validation Field (GVF). A group is valid only if the value in the GVF in the group header is greater than or equal to the sum of the GVF values in the group elements.

Print formats are text documents with input field embedded in it. A transaction form can be printed along with the data entered in it. The format of the printed document will be the same as the print format with the input fields replaced with actual data.

Information View I View

An Information View is a set of related SQL statements that provide data to a view format. It governs the information presentation function of an information system.

Information view are of two types
Tabular
Free form

The classification is based on the format in which the view is to be presented.

A Tabular View consists of a set of SQL statements. The SQL result sets are related by defining a relation field. Rows in the result sets that have the same value in the relation field are colleated into one row & presented in the IVview.

Every column in each result set is represented as column in the IVview. The IView can have additional columns which may be computed based on an expression. The expression may include conditional statements also.

Columns in the Iview can be grouped based on a GROUP FIELD. All rows that have the same value in the group field are collated & presented as one row in the IView.

Multi level control breaks can be defined in a an IView by defining key columns. A total line is printed when the value in the key column change. Further, report balance can be defined on any control break. In such a case, a closing and opening balance is automatically printed.

The features discussed above, facilitate making of all kinds of tabular reports that may be required in an information system without writing programs to achieve the same.

A Free Form View consists of a set of SQL statements and a text document with print fields embedded in the document.

Print fields are replaced with actual data before printing the report. The actual data are drawn from the SQL result sets.

The executor engine reads an Iview, executes the SQL statements and prepares the Iview and presents it as an information form to the user.

The Information form provides features to navigate through the Iview and select any row for further drill down.

A drill down facility can be achieved by linking two Iview. Any column from the selected row can be set to provide parameter values to the SQL statements in the linked Iview.

A row in the Iview may also be linked to a transaction form. In such a case, the transaction form will be displayed by the executor engine with data related to the selected row in the Iview.

Charts

FIG. 1 of the drawing shows the open-ended architecture of a tool for building an information system 100. FIG. 2 of the drawings shows the development cycle 200 as per the prior art, which includes scoping 210, requirement study 220, system design, database design 230, program design 240, coding 250, testing 260, training 270 and implementation 280.

The software executor engine invented by us will cut short the software development cycle to a great extent. Programming efforts will be removed completely from the development cycle. The time saving could be described as follows: What can be done by an experienced programmer in a month, can be done by a non-programmer in just a few hours. The time saving ratio is 1:50. FIG. 3 of the drawings shows the development cycle 300 with the tool 100 which includes scoping 310, requirement study 320, solution definition document preparation 330, solution definition 340, testing 350, training 360 and implementation 370.

FIG. 4 shows the time frame 400 for building an information system in conventional method. The methodology includes development of the modules for a small manufacturing enterprise right from system study, design & complete coding. The basic modules covered are financial accounting, inventory, production planning and control, order processing and payroll.

FIG. 5 shows in detail the time frame 500 for building an information system with products developed in the prior art. This methodology includes customization of basic existing modules for a small manufacturing enterprise. The enhancements could be achieved only by modifying the program. The basic modules covered are financial accounting, inventory, production planning and control, order processing and payroll.

FIG. 6 shows the time frame 600 for building an information system with products developed in the prior art. This methodology includes definition of the complete requirements for a small manufacturing enterprise without programming. The enhancements could be achieved by merely modifying the definitions but not coding. The basic modules covered are financial accounting, inventory, production planning and control, order processing and payroll.

The invention provides a new method to build and create an information system.

Advantages of PROFIT 5RM Architecture

Domain Neutral

Information systems for any kind of enterprise, industry or organization can be built using Profit 5RM.

Time

This methodology completely eliminates software programming. Hence, an information system can be built in a very short time and with ease.

Cost

A domain expert can build an information system without using a programming team and hence, the built information system will cost much less.

Maintenance

The transaction structures and information views that are the building blocks of the information system are stored as data and hence can be maintained with ease.

Change Management

Changes to processes can be done on the fly and at site because changes to processes now mean changes to transaction structures and information views that are stored as data.

No Programming Required

Domain experts need not depend on a programming team get an information system in place with this methodology as there is no programming involved. Hence a solution built on this platform will have an extremely high rate of success.

Easy Scalability

The PRS services are simple objects, which can be extended to support new technologies by wrapping them in appropriate interface classes. For example these services may be made into Web services by creating SOAP (simple object Access Protocol) interfaces. Hence, this layer can be scaled to any new technology with ease and speed.

As business processes are stored as data, scaling the PRS will not affect the information system that has been already defined.

Similarly, altering the definitions immaterial of the technology extensions made to the PRS can change the business process themselves.

The architecture facilities PROFIT 5RM to act as an information system foundation for any enterprise.

It is therefore evident that the Application of the invention is in building information systems for all lines of businesses.

Salient Features of the Invention

1. A claim is made for the incorporation of an unique technology, which enables an information system to be built by representing the system requirements as Transaction structures and information views and storing them as data, instead of writing software programs to achieve the same, thus making information system building simple and quick.

2. A claim is made for the incorporation of an open-ended architecture of PROFIT 5RM (as illustrated in FIG. 1). This facilitates easy scalability to new technologies without affecting the already made information structure. Further, the technology allows change in the information structure immaterial of the technology extensions made.

3. A claim is made for the unique versatile executor engine, which interprets and executes the transaction structures and information views.

4. A claim is made for the technology which reduces software development cycle time in a ratio of 1:50 compared to the traditional methodology.

5. A claim is made for the technology, which is domain-neutral and hence that can be used to build information systems for all domains.

6. A claim is made for the technology, which facilitates onsite as well as online development and which can be maintained with ease.

The invention claimed is:

1. A non-transitory computer-readable medium having stored thereon a tool for building an information system, the tool comprising:
   a builder component that receives one or more transaction structures and one or more information views that form a business process, and creates a plurality of definitions using the one or more transaction structures and the one or more information views; and
   an executor engine component that uses the plurality of definitions created by the builder component to assemble the information system at run time;
   wherein after the information system is assembled, the information system is modifiable or expandable by one or more additional transaction structures and/or one or more additional information views without any down time.

2. The tool of claim 1, wherein each of the one or more transaction structures comprises one or more data containers, one or more input fields, one or more graphical user interface definitions, one or more validation statements, one or more process maps, or one or more print formats.

3. The tool of claim 1, further comprising a database wherein the definitions created by the builder component are stored as definition data in the database and accessed by the executor engine component.

4. The tool of claim 1, wherein after the information system is assembled, the builder component is capable of receiving the one or more additional transaction structures and/or the one or more additional information views and creating one or more additional definitions, and the executor engine component is capable of assembling the one or more additional definitions created by the builder component to modify and expand the existing information system without any down time.

5. The tool of claim 1, wherein the executor engine component comprises:
   a process request server that processes one or more transaction or information requests; and
   a graphical user interface layer that presents a user interface of the information system to a user, receives one or more transaction or information requests, and submits the one or more transaction or information requests to the process request server.

6. The tool of claim 1, wherein the information system is domain-neutral.

7. The tool of claim 1, wherein the one or more transaction structures, the one or more information views, the one or more additional transaction structures or the one or more additional information views is received via the Internet.

8. A method of building an information system onto a computer-readable medium comprising:
   creating a plurality of definitions with a builder that uses one or more transaction structures and one or more information views that form a business process;
   assembling the information system with an executor engine that uses the plurality of definitions created by the builder to assemble the information system at run time;
   modifying and expanding the information system without any downtime, if one or more additional transaction structures and/or one or more additional information views are received by the builder.

* * * * *